(12) United States Patent
Laskowski

(10) Patent No.: US 10,352,251 B2
(45) Date of Patent: Jul. 16, 2019

(54) SYSTEMS AND METHODS FOR CONTROLLING LOAD RATE OF CHANGE USING A VARIABLE MULTIPLIER

(71) Applicant: General Electric Company, Schenectady, NY (US)

(72) Inventor: Benjamin David Laskowski, Greenville, SC (US)

(73) Assignee: General Electric Company, Schenectady, NY (US)

( * ) Notice: Subject to any disclaimer, the term of this patent is extended or adjusted under 35 U.S.C. 154(b) by 208 days.

(21) Appl. No.: 15/414,475

(22) Filed: Jan. 24, 2017

(65) Prior Publication Data

US 2018/0016990 A1    Jan. 18, 2018

Related U.S. Application Data

(60) Provisional application No. 62/362,276, filed on Jul. 14, 2016.

(51) Int. Cl.
| | |
|---|---|
| *G06F 19/00* | (2018.01) |
| *F02C 9/28* | (2006.01) |
| *H02J 3/46* | (2006.01) |
| *F01D 17/04* | (2006.01) |
| *H02J 3/38* | (2006.01) |

(52) U.S. Cl.
CPC ............... *F02C 9/28* (2013.01); *F01D 17/04* (2013.01); *H02J 3/381* (2013.01); *H02J 3/46* (2013.01); *F05D 2270/309* (2013.01); *F05D 2270/335* (2013.01)

(58) Field of Classification Search
CPC ............... F02C 9/28; F05D 2270/309; F05D 2270/335; H02J 3/382; H02J 3/46
See application file for complete search history.

(56) References Cited

U.S. PATENT DOCUMENTS

| | | | | |
|---|---|---|---|---|
| 4,550,565 | A | * 11/1985 | Ozono | ................ F01K 23/101 |
| | | | | 60/39.182 |
| 6,807,501 | B1 | * 10/2004 | Hyde | ................... E21B 43/122 |
| | | | | 700/28 |

(Continued)

OTHER PUBLICATIONS

U.S. Appl. No. 15/383,859, filed Dec. 19, 2016, Benjamin David Laskowski.

*Primary Examiner* — Kidest Bahta
(74) *Attorney, Agent, or Firm* — Fletcher Yoder P.C.

(57) ABSTRACT

A method includes determining a commanded load rate of change of an industrial system, wherein the commanded load rate of change comprises a rate of load placed on an industrial machine of the industrial system. The method also includes determining a measured load rate of change of the industrial system based at least in part on an output power of the industrial system. The method further includes determining a variable multiplier based at least in part on the commanded load rate of change and the measured load rate of change. The method also includes applying the variable multiplier to a load rate command to the industrial system to generate a multiplied load rate command. The method further includes sending a signal to the industrial system to control the rate of the load placed on the industrial machine based at least in part on the multiplied load rate command.

20 Claims, 4 Drawing Sheets

(56) References Cited

U.S. PATENT DOCUMENTS

| | | | |
|---|---|---|---|
| 6,896,404 B2 * | 5/2005 | Seki | G05B 11/42 |
| | | | 374/29 |
| 7,406,371 B2 * | 7/2008 | Izawa | B60G 17/0182 |
| | | | 280/5.5 |
| 2010/0013243 A1 * | 1/2010 | Halsey | F01D 15/10 |
| | | | 290/40 A |
| 2012/0173033 A1 * | 7/2012 | Tischer | H02J 3/14 |
| | | | 700/295 |
| 2014/0222230 A1 * | 8/2014 | Shimizu | G05B 13/02 |
| | | | 700/291 |
| 2017/0315836 A1 * | 11/2017 | Langer | H04L 43/0882 |

* cited by examiner

SYSTEMS AND METHODS FOR CONTROLLING LOAD RATE OF CHANGE USING A VARIABLE MULTIPLIER

CROSS REFERENCE TO RELATED APPLICATIONS

This application claims priority from and the benefit of U.S. Provisional Application Ser. No. 62/362,276, entitled "SYSTEMS AND METHODS FOR CONTROLLING LOAD RATE OF CHANGE USING A VARIABLE MULTIPLIER," filed Jul. 14, 2016, which is hereby incorporated by reference in its entirety for all purposes.

BACKGROUND OF THE INVENTION

The subject matter disclosed herein relates to industrial control systems, and more specifically, to controlling load rate of change for one or more industrial machines, such as turbomachinery.

Certain systems, such as an industrial control system, may control a load rate of change of one or more industrial machines. For example, one or more components of the industrial control system may control turbomachinery (e.g., turbine systems or generator systems) that may be included in an industrial system (e.g., a power generation system).

In some situations, a user-specified load rate of change for the turbomachinery may be maintained. The load rate of change may refer to a change of an amount of load (e.g., electrical power output to an electrical transmission or distribution grid, mechanical power output to an industrial machine, and so forth) that may be placed upon the turbomachinery (e.g., gas turbine, steam turbine, generator, and the like) per unit of time. To meet this load rate of change, the industrial control system may apply a fixed multiplier (e.g., a frame-specific constant such as 1.2× for a Frame 9FA turbine by General Electric Company®) corresponding to the given average load rate of change to a commanded load rate of change of the industrial system.

However, the fixed multiplier solution may be inadequate in certain situations. For example, applying the fixed multiplier may achieve the given average load rate of change for certain (e.g., larger) load changes. But it may be difficult to meet the given average load rate of change for smaller load changes. Additionally, while the given average load rate of change may be met for certain load changes, the fixed multiplier may not ensure that the given load rate of change will be maintained. For example, a number of variables, such as variations in ambient conditions, machine degradation, and/or operation on varying load paths, may be introduced which may affect a given load rate of change using the fixed multiplier solution.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method includes determining, via a processor, a commanded load rate of change of an industrial system, wherein the commanded load rate of change comprises a rate of load placed on an industrial machine of the industrial system. The method also includes determining, via the processor, a measured load rate of change of the industrial system based at least in part on an output power of the industrial system. The method further includes determining, via the processor, a variable multiplier based at least in part on the commanded load rate of change and the measured load rate of change. The method also includes applying, via the processor, the variable multiplier to a load rate command to the industrial system. The method further includes sending, via the processor, a signal to the industrial system to control the rate of the load placed on the industrial machine based at least in part on the multiplied load rate command.

In a second embodiment, a system includes a gas turbine system that includes a gas turbine and a load. The system also includes a sensor communicatively coupled to the gas turbine system that detects an output power of the gas turbine system. The system further includes a controller communicatively coupled to the gas turbine and the sensor. The controller includes a processor, wherein the processor determines a commanded load rate of change of the gas turbine system, wherein the commanded load rate of change includes a rate of the load placed on the gas turbine. The processor also determines a measured load rate of change of the gas turbine system based at least in part on the output power of the gas turbine system provided by the sensor. The processor further determines a variable multiplier based at least in part on the commanded load rate of change and the measured load rate of change. The processor also applies the variable multiplier to a load rate command to the gas turbine system. The processor further sends a signal to the gas turbine system to control the rate of the load based at least in part on the multiplied load rate command.

In a third embodiment, one or more tangible, non-transitory, machine-readable media including instructions that cause a processor to determine a commanded load rate of change of an industrial system, wherein the commanded load rate of change includes a rate of load placed on an industrial machine of the industrial system. The instructions also cause the processor to determine a measured load rate of change of the industrial system based at least in part on an output power of the industrial system. The instructions further cause the processor to determine a variable multiplier based at least in part on the commanded load rate of change and the measured load rate of change. The instructions also cause the processor to apply the variable multiplier to a load rate command to the industrial system. The instructions further cause the processor to send a signal to the industrial system to control the rate of the load placed on the industrial machine based at least in part on the multiplied load rate command.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
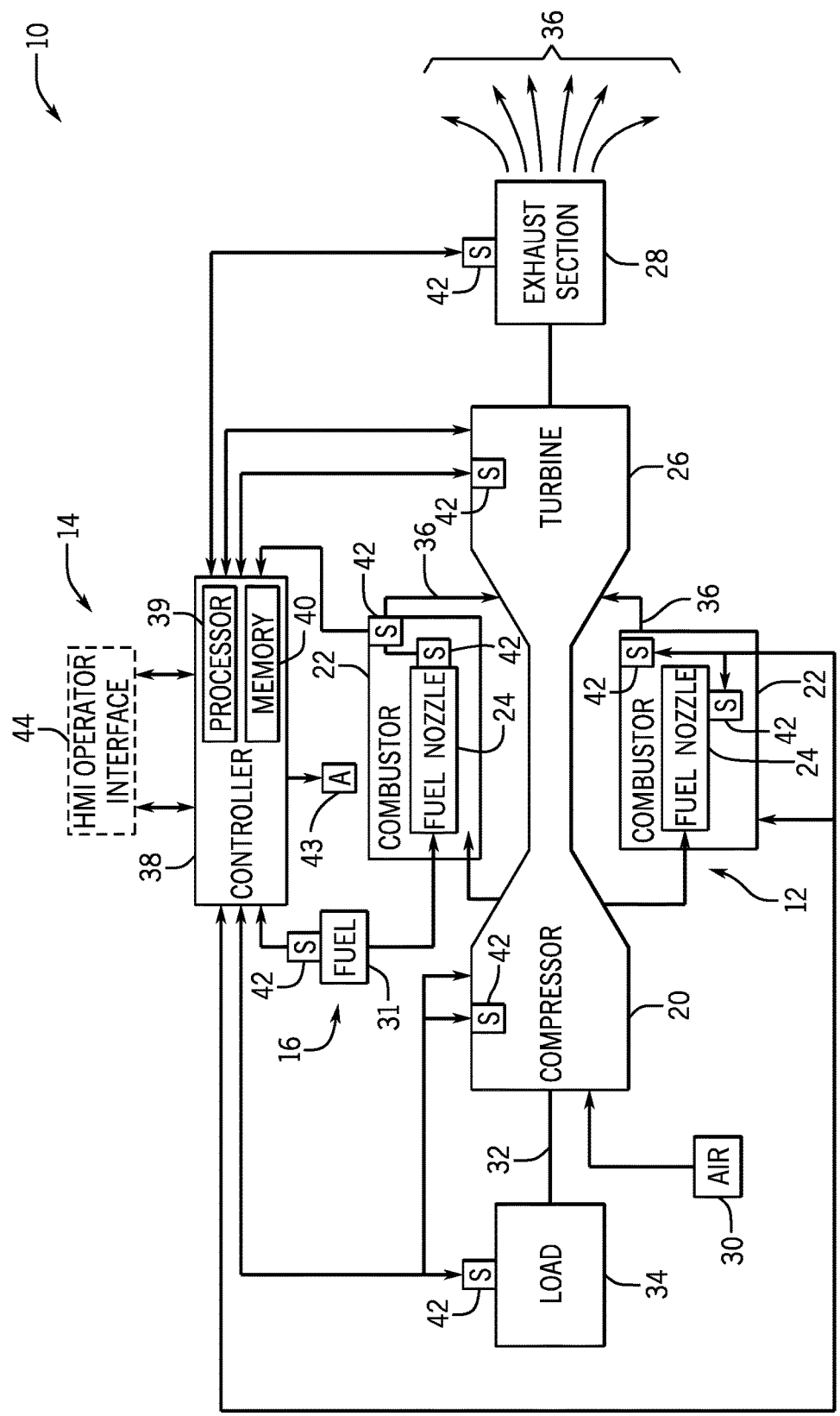
FIG. 1 is a block diagram of an embodiment of an industrial system including one or more industrial machines, in accordance with the present embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As mentioned above, an industrial control system may control a load rate of change of an industrial system, such as turbomachinery (e.g., a gas turbine, a generator, etc.), by applying a fixed multiplier corresponding to a given average load rate of change to a commanded load rate of change of the industrial system. While applying the fixed multiplier may achieve the given average load rate of change for certain (e.g., relatively larger) load changes (e.g., in the range of greater than or equal to 77 megawatts (MW)), the given average load rate of change may often not be met for smaller load changes (e.g., in the range of less than 77 MW. This may be the case because a time period for a corresponding load change may be longer for a relatively larger change, resulting in an additional amount of time to reach the given average load rate of change.

Additionally, while the given average load rate of change may be met for the certain load changes over a time period corresponding to the change in load, the given average load rate of change may not be maintained at a constant rate over the change in load. This may be at least in part because of environmental conditions, manufacturing variations, operational changes, and the like. For example, variations as related to ambient temperatures, an operational profile of the industrial system, condition/degradation of industrial system components, machinery/manufacturing of the industrial system components, and the like, may affect and change the load rate of change of the industrial system, causing undesirable variations in the given average load rate of change.

Present embodiments relate to systems and methods for controlling a load rate of change in the industrial system, such that a given average load rate of change may be maintained over relatively smaller (e.g., a range of less than 77 MW) changes in load and maintaining the given average load rate of change despite certain variations that typically may interfere with the given average load rate of change. Specifically, the industrial control system embodiments described herein may use closed loop load rate control (CLLRC) to determine a variable multiplier based at least in part on the commanded load rate of change and a measured load rate of change. The variable multiplier may be applied to a load rate command of the industrial system. As such, the CLLRC may account for variations due to the environment, manufacturing of the industrial system, operation of the industrial system, and the like. The industrial control system may thus enable the industrial system to achieve a given average load rate of change over a larger span of operational characteristics (e.g., smaller load changes) and maintain the given average load at a constant rate over the change in load As used herein, "load rate of change" may refer to a change of an amount of load (e.g., electrical power output to an electrical transmission or distribution grid, mechanical power output to an industrial machine, and so forth) that may be placed upon a power generating machine (e.g., gas turbine, steam turbine, generator, and the like) per unit of time. For example, for a gas turbine system, a steam turbine system, or other similar power generation system, the "load rate of change" may be measured in units of megawatts (MW) per unit time (e.g., MW/min, MW/sec). The techniques described herein may be applicable to other turbomachinery, such as heat recovery steam generation (HRSG) systems, steam turbines, compressors, and the like.

With the foregoing in mind, an example of an industrial system is illustrated in FIG. 1. While the present embodiments are discussed with respect to a gas turbine system (e.g., as illustrated in FIG. 1), it should be appreciated that the industrial system 10 may, in some embodiments, include a steam turbine system, a hydraulic turbine system, one or more compressor systems (e.g., aeroderivative compressors, reciprocating compressors, centrifugal compressors, axial compressors, screw compressors, and so forth), one or more electric motor systems, industrial systems including, for example, fans, extruders, blowers, centrifugal pumps, or any of various other industrial machinery that may be included in an industrial plant or other industrial facility. As will be further appreciated, the techniques discussed herein may be used to control any of the aforementioned industrial machinery, or any combination of the industrial machinery.

As illustrated in FIG. 1, the industrial system 10 includes the gas turbine system 12, a monitoring and control system 14, and a fuel supply system 16. The gas turbine system 12 may include a compressor 20, combustion systems 22, fuel nozzles 24, a gas turbine 26, and an exhaust section 28. During operation, the gas turbine system 12 may pull air 30 into the compressor 20, which may then compress the air 30 and move the air 30 to the combustion system 22 (e.g., which may include a number of combustors). In the combustion system 22, the fuel nozzle 24 (or a number of fuel nozzles 24) may inject fuel that mixes with the compressed air 30 to create, for example, an air-fuel mixture.

The air-fuel mixture may combust in the combustion system 22 to generate hot combustion gases, which flow downstream into the turbine 26 to drive one or more turbine stages. For example, the combustion gases may move through the turbine 26 to drive one or more stages of turbine blades, which may in turn drive rotation of a shaft 32. The shaft 32 may connect to a load 34, such as a generator that uses the torque of the shaft 32 to produce electricity. After passing through the turbine 26, the hot combustion gases may vent as exhaust gases 36 into the environment by way of the exhaust section 28. The exhaust gas 36 may include gases such as carbon dioxide ($CO_2$), carbon monoxide (CO), nitrogen oxides ($NO_x$), and so forth.

In certain embodiments, the system 10 may also include a controller 38. The controller 38 may be communicatively coupled to a number of sensors 42, a human machine interface (HMI) operator interface 44, and one or more actuators 43 suitable for controlling components of the system 10. The actuators 43 may include valves, switches, positioners, pumps, and the like, suitable for controlling the various components of the system 10. The controller 38 may receive data from the sensors 42, and may be used to control the compressor 20, the combustors 22, the turbine 26, the exhaust section 28, the load 34, and so forth.

In the current embodiments, the load rate of change may be implemented by the system 10 using Closed Loop Load Rate Control (CLLRC). For example, the actuators 43 may include a load regulator that may be used implement a commanded load rate of change to the turbine system 12 (e.g., the load 34 and the turbine 26). As discussed herein, CLLRC may apply a variable multiplier to the load regulator. The variable multiplier may be chose such that the instantaneous load rate of change matches the commanded load rate of change, or in some cases, a load rate of change that is calculated to maintain a given average load rate of change over a load range. The HMI operator interface 44 may be used to receive operator inputs that may be provided to the controller 38 (e.g., a user-specified load rate of change). As will be further appreciated, in response to the sensor 42 data and/or inputs received via the HMI operator interface 44, the controller 38 may control a load rate of change for the turbine 26 to achieve a given average load rate of change. By applying the variable multiplier, the turbine 26 may achieve the given average load rate of change over a relatively larger span of operational characteristics (e.g., smaller load changes) than systems that do not implement CLLRC. Further, the given average load rate of change may be maintained at a constant rate over the change in load.

In certain embodiments, the HMI operator interface 44 may be executable by one or more computer systems of the system 10. A plant operator may interface with the industrial system 10 via the HMI operator interface 44. Accordingly, the HMI operator interface 44 may include various input and output devices (e.g., mouse, keyboard, monitor, touch screen, or other suitable input and/or output device) such that the plant operator may provide commands (e.g., control and/or operational commands) to the controller 38. Further, operational information from the controller 38 and/or the sensors 42 may be presented via the HMI operator interface 44. Similarly, the controller 38 may be responsible for controlling one or more final control elements coupled to the components (e.g., the compressor 20, the turbine 26, the combustors 22, the load 34, and so forth) of the industrial system 10 such as, for example, one or more actuators, valves, transducers, and so forth.

In certain embodiments, the sensors 42 may be any of various sensors useful in providing various operational data to the controller 38. For example, the sensors 42 may provide pressure and temperature of the compressor 20, speed and temperature of the turbine 26, vibration of the compressor 20 and the turbine 26, $CO_2$ levels in the exhaust gas 36, carbon content in the fuel 31, temperature of the fuel 31, temperature, pressure, clearance of the compressor 20 and the turbine 26 (e.g., distance between the compressor 20 and the turbine 26 and/or between other stationary and/or rotating components that may be included within the industrial system 10), flame temperature or intensity, vibration, combustion dynamics (e.g., fluctuations in pressure, flame intensity, and so forth), load data from load 34, output power from the turbine 26, and so forth.

The controller 38 may include a processor(s) 39 (e.g., a microprocessor(s)) that may execute software programs to perform the disclosed techniques. Moreover, the processor 39 may include multiple microprocessors, one or more "general-purpose" microprocessors, one or more special-purpose microprocessors, and/or one or more application specific integrated circuits (ASICS), or some combination thereof. For example, the processor 39 may include one or more reduced instruction set (RISC) processors. The controller 38 may include a memory device 40 that may store information such as control software, look up tables, configuration data, etc. The memory device 40 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof). The memory device 40 may store a variety of information, which may be suitable for various purposes. For example, the memory device 40 may store machine-readable and/or processor-executable instructions (e.g., firmware or software) for the processor execution. In one embodiment, the instructions, when executed, cause the processor 39 to determine a commanded load rate of change of the turbine system 12. For example, in one embodiment, the processor 39 may determine the commanded load rate of change based on a load setpoint of the turbine system 12.

In certain embodiments, the instructions cause the processor 39 to determine a measured load rate of change of the turbine system 12. The measured load rate of change refers to a load rate of change of the turbine system 12 that is determined based at least in part on measurements performed on the turbine system 12. The measurements may be performed by one or more sensors 42. For example, the measured load rate of change may be determined based at least in part on a measured output power of the turbine system 12.

In some embodiments, the instructions may cause the processor 39 to determine a variable multiplier based at least in part on the commanded load rate of change and the measured load rate of change. Further, the instructions may cause the processor 39 to apply the variable multiplier to a load rate command. For example, in one embodiment, the variable multiplier is applied to the load rate command by multiplying the load rate command by the variable multiplier. The controller 38 may then send a signal to a load regulator of the turbine system 12 to control the load rate of change of the turbine system 12 based on the multiplied load rate command.

As mentioned above, in contrast to the fixed multiplier techniques, by using the CLLRC techniques described herein, a variable multiplier may be frequently updated, resulting in a number of efficiencies. In some embodiments, the multiplier is updated while load is moving in response to change in load setpoint. However, in some embodiments, the variable multiplier is not adjusted when the load change is a result of primary frequency response or protective runbacks.

Figure 2:
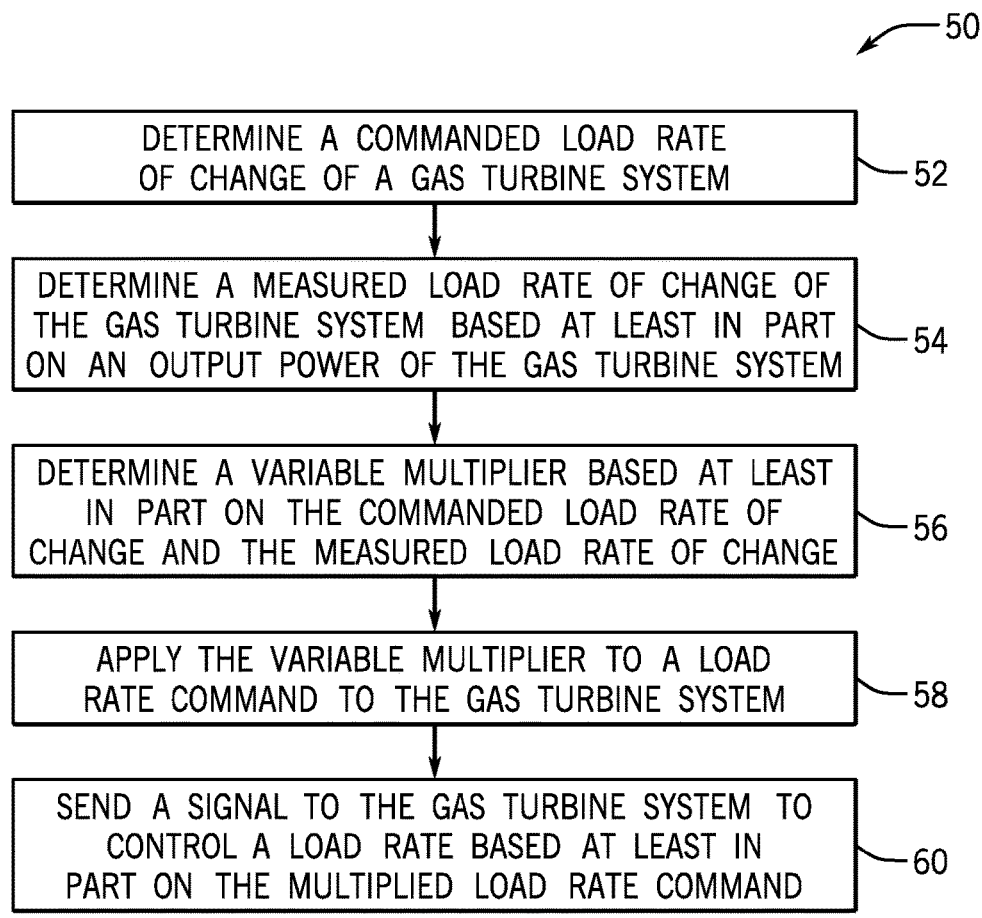
FIG. 2 is a flowchart of a method for controlling a load rate of change of the industrial machine of FIG. 1, in accordance with an embodiment of the present disclosure.

FIG. 2 is a flowchart of a process 50 for controlling a load rate of change of the turbine system 12 of FIG. 1, in accordance with an embodiment of the present disclosure. The process 50 may be performed by the processor 39 of the controller 38. The processor 39 may determine a commanded load rate of change of the turbine system 12 (block 52). The commanded load rate of change may be determined based on a load setpoint of the turbine system 12, wherein the load setpoint is an amount of load to be placed on the turbine system 12. In some embodiments, the load setpoint may be a stepped input (e.g., where the amount of load placed on the turbine system 12 is changed to the load setpoint in a series of one or more steps). In such embodiments, the load setpoint is received as a stepped load rate input received at the controller 38 or from the HMI operator interface 44. As such, the processor 39 may determine the commanded load rate of change to be the stepped load rate received at the monitoring and control system 14 or from the HMI operator interface 44.

In some embodiments, the load setpoint may be a ramped input (e.g., where the amount of load placed on the turbine system 12 is varied in a ramped fashion). Successive varied load setpoint inputs may be received periodically, wherein a period between receiving consecutive updated load setpoints may be based on the monitoring and control system 14 and/or standardization. For example, the period may be between 40 milliseconds (ms) and 8 seconds.

In such a scenario of ramped input, it may be advantageous to learn the rate at which the setpoint is ramped for use as a reference. The controller 38 may include rate detection logic that determines an elapsed time between the successive load setpoints. The processor 39 may divide a difference between the successive load amounts by the elapsed time to obtain an average load rate of change. The commanded load rate of change may then be determined to be the average load rate of change. When the time between successive samples increases beyond a period threshold (e.g., a range of greater or equal to 8 seconds, 8.1 seconds, etc.), the load setpoint is assumed to be stepped, and the commanded load rate of change may be determined based on the stepped load setpoint.

In some embodiments, the turbine system 12 may include an operation based on setting a temperature of the turbine system 12 to match a desired temperature rate of change. In such embodiments, a local load rate of change may be used, as this rate is typically used to maintain the desired temperature rate of change to prolong the lifetime of a Heat Recovery Steam Generator (HRSG). In such embodiments, the commanded load rate of change may be determined based on the local load rate of change.

The controller 39 may determine a measured load rate of change of the turbine system 12 based at least in part on a measured output power of the turbine system 12 (block 54). An output power signal indicative of the measured output power may be received based on a sensor 42 of the turbine system. In some embodiments, an instantaneous measured load rate of change may be determined. Typically, the output power signal may include significant noise. As such, in some embodiments, a filter may be used to reduce the noise from the output power signal. For example, the filter may include a load rate limit component, a backward difference component, and a lag component. Preset logic of the filter may hold noise and activity downstream of the component to zero when a load is within a deadband of the load setpoint (e.g., wherein the load setpoint is approximately constant).

The load rate limit component of the filter may set increasing and decreasing load rate thresholds to vary a bandwidth of the filter effectively. For example, the load rate limit component of the filter may set increasing and decreasing load rate thresholds to twice the determined commanded load rate of change. As such, noise that may be above a load rate that may be commanded (e.g., above the increasing load rate threshold or below the decreasing load rate threshold) may be detected and reduced, while still imposing a low-pass filter on the output power signal to reduce higher-order noise. When an output of the load rate limit component differs from the output power of the turbine system 12 by more than a first threshold power (e.g., 5 MW), the load rate limit output may be preset to the output power. The output power may be received from a sensor 42 of the turbine system 12. When the output power is within a second threshold power (e.g., 0.5 MW) of a corresponding load setpoint, the load rate limit output may be maintained at its current value until the output power is no longer within a third threshold power (e.g., 1.5 MW) of the corresponding load setpoint. When the load rate limit output is released, the preset logic (which may set the load rate limit output to a current value of the output power signal) may be triggered for one frame.

The backward difference component may differentiate (e.g., take the derivative of) the filtered output signal by subtracting the load rate limit output of the last frame of the output power signal from the current frame load rate limit output. The resulting value may be multiplied by a reciprocal of the frame period. The result may be a relatively noisy estimate of the power output rate of change. In some embodiments, the rate of change may be converted to an alternative unit of measurement (e.g., multiplied by 60 to convert from MW/sec to MW/min in some embodiments).

The backward difference may be lagged with a time constant (e.g., 0.5 seconds) to smooth the data. In operations based on setting a temperature of the turbine system 12 to match a desired temperature rate of change (e.g., "Temperature Match mode"), the output of the lag may be passed through a rolling average (e.g., a 5 second rolling average). The final rolling average may be used during plant startup when load rates of change are historically quite low to avoid reducing the lifetime of components of the turbine system 12. Each time the load rate limit is released, the lag and rolling averages may be preset to zero. This may ensure that noise that might have been captured at a constant load is not taken into account in later stages of load rate regulation. As such, an accurate instantaneous measured load rate of change may be determined.

In some embodiments, a trajectory-style control may be implemented to match an average measured load rate of change across the interval with the commanded load rate of change. This trajectory-style control, in some embodiments, may be selectively enabled and/or disabled. In some embodiments, by default, the trajectory-style control is enabled when the system is not in "Temperature Match mode." An average measured load rate of change across an interval may be determined. Each time the commanded load rate of change or the load setpoint changes, the controller 38 may save a current power output value and target power output value. For example, the current power output value and the target power output value may be saved in the memory device 40. The difference between these values is divided by the commanded load rate of change to determine a time that elapsed during the change. A free-running timer may also be reset. A remaining load change corresponding to a time between the interval and the elapsed time is divided by the difference between the interval and the elapsed time to give the average load rate of change that may be maintained for the rest of the interval. When enabled, the trajectory-style control may cause downstream logic to adjust the instantaneous measured load rate of change to meet the average measured load rate of change.

In some embodiments, a second calculation may be performed to determine the average measured load rate of change across the interval. Each time the current load is saved, a second timer is reset. During the subsequent load change, the difference between the current load and saved load is divided by the elapsed time. When the power output of the turbine system 12 is within a small deadband of the load setpoint as previously described, the current power output value is saved and the second timer is stopped to determine the resulting average measured load value. The resulting average measured load value may be useful for debugging and remote monitoring.

When the load setpoint is ramped, the controller 38 may not be able to accurately determine a final value of the load setpoint. In these cases, a new load setpoint may be assumed to be a threshold power (e.g., 5 MW) above (for increasing ramps) or below (for decreasing ramps) the current power output feedback value. Over time, this ramped load setpoint technique may converge on the technique for the stepped load setpoint case.

The controller 38 may determine a variable multiplier based at least in part on the commanded load rate of change and the measured load rate of change (block 56). The controller 38 may include a proportional-integral regulator that may calculate the variable multiplier based on the difference between the commanded load rate of change and the measured load rate of change. The measured load rate of change may include either the instantaneous measured load rate of change or the average measured load rate of change as determined above. In some embodiments, the variable multiplier may be between a minimum and a maximum threshold. For example, the variable multiplier may be between 0.75 and a ratio of a desired (e.g., maximum) permissible load rate of change to the commanded load rate of change. In some embodiments, the variable multiplier may be set to 1 when the load is within a certain deadband of the load setpoint or when a primary frequency response may be responsible for load changes. Further, in some embodiments, when the controller 38 is booted up, the variable multiplier may be preset to 1.

The controller 38 may apply the variable multiplier to a load rate command to the turbine system 12 (block 58). In some embodiments, the multiplied load rate command may be further multiplied by a tuning multiplier. In some embodiments, the multiplied load rate command may be applied to the desired (e.g., maximum) load rate of change before being supplied to downstream fuel control logic.

The controller 38 may then send a signal to the turbine system 12 to control a load rate of change based at least in part on the multiplied load rate command (block 60). In some embodiments, the signal may be sent to a load regulator (e.g., of the actuators 43) of the turbine system 12. In alternative embodiments, the load regulator may be a part of the controller 38, and the controller 38 may send the signal directly to the turbine system 12.

Figure 3:
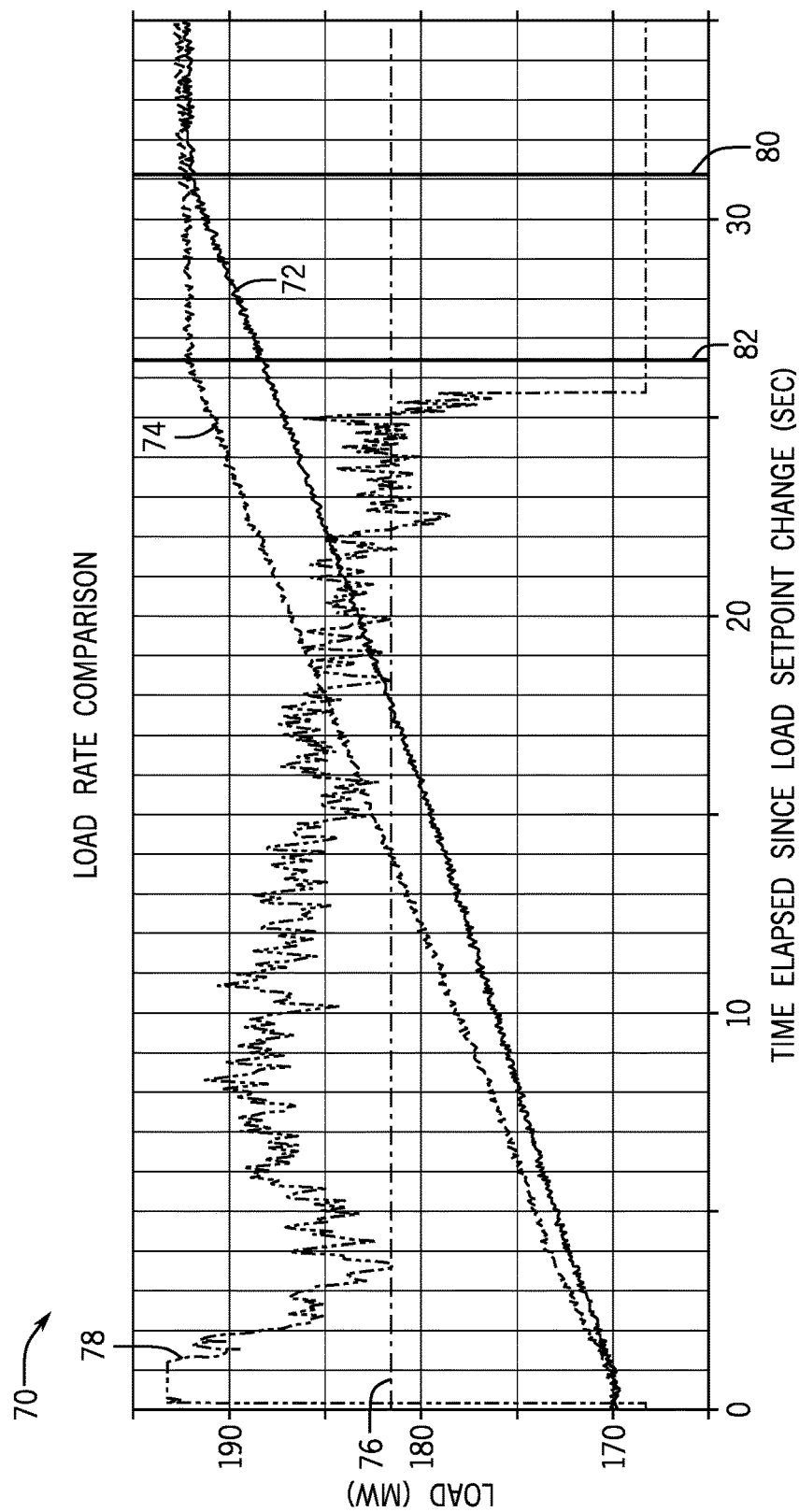
FIG. 3 is a graph comparing load rates of change using a fixed multiplier and a variable multiplier for a relatively smaller load change, in accordance with an embodiment of the present disclosure.

FIG. 3 is a graph 70 comparing load rates of change using a fixed multiplier and a variable multiplier for a relatively small load change (e.g., in the range of less than 77 MW), in accordance with an embodiment of the present disclosure. The respective techniques each attempt to achieve an average load rate of change of 50 MW/min for a 22 MW load change.

A first curve 72 represents a load rate of change of the turbine system 12 using a fixed multiplier. A second curve 76 represents a product of the load rate command to the turbine 26 and the fixed multiplier, which is constant.

As mentioned above, use of the fixed multiplier does not account for environmental conditions, manufacturing variations, operational changes, and the like. Indeed, the fixed multiplier does not account for variations in instantaneous load and/or average load to the new setpoint. For example, as illustrated by section 77 of first curve 72, the load rate of change is approximately 3.5 MW (173.5 MW-170 MW)/6 sec*60 sec/1 min=35 MW/min, far lower than the desired 50 MW/min. Thus, the first curve 72 achieves the 22 MW load change at approximately 31 seconds (depicted by line 80), averages 42.77 MW/min, and does not achieve the 50 MW/min average load rate of change.

A third curve 74 represents a load rate of change of the turbine system 12 when using the variable multiplier. A fourth curve 78 represents a product of the load rate command to the turbine 26 and the variable multiplier, which varies with the variable multiplier. Because the variable multiplier accounts for instantaneous load, the load rate of change may be slightly modified by the variable multiplier. In the same period of time as the portion 77, the variable multiplier scheme results in a tighter load rate of change, closer to the desired load rate of change. For example, the load rate of change of portion 79 of third curve 74 is approximately 5 MW (175 MW-170 MW)/6 sec*60 sec/1 min=50 MW/min, the desired load rate of change. This load rate of change remains constant, as illustrated on the third curve 74. Thus, as illustrated, the third curve 74 achieves the 22 MW load change at approximately 26.4 seconds (82), averages 50.03 MW/min, and thus approximately achieves the 50 MW/min average load rate of change.

Figure 4:
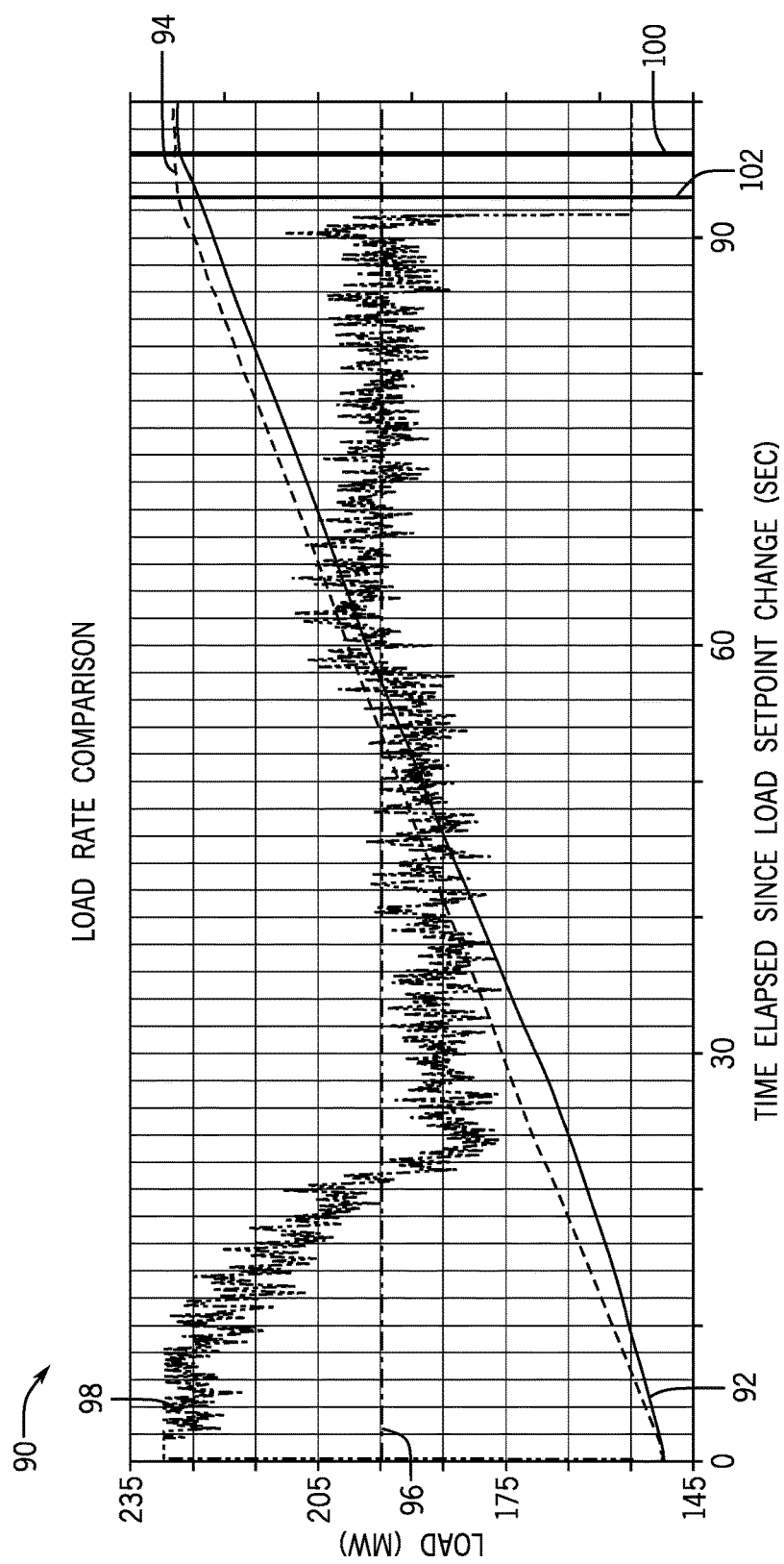
FIG. 4 is a graph comparing load rates of change using the fixed multiplier and the variable multiplier for a relatively larger load change, in accordance with an embodiment of the present disclosure.

FIG. 4 is a graph 90 comparing load rates of change using the fixed multiplier and the variable multiplier for a relatively large load change (e.g., in the range of greater than or equal to 77 MW), in accordance with an embodiment of the present disclosure. The respective techniques attempt to achieve an average load rate of change of 50 MW/min for a 77 MW load change.

A first curve 92 represents a load rate of change of the turbine system 12 using the fixed multiplier. A second curve 96 represents a product of the load rate command to the turbine 26 and the fixed multiplier, which is constant.

As mentioned above, use of the fixed multiplier may have better performance for larger load changes. Thus, the first curve 92 achieves the 77 MW load change at approximately 98 seconds (100), averages 48.14 MW/min, and nearly achieves the 50 MW/min average load rate of change.

A third curve 94 represents a load rate of change of the turbine system 12 when using the variable multiplier. A fourth curve 98 represents a product of the load rate command to the turbine 26 and the variable multiplier, which varies with the variable multiplier. As illustrated, the third curve 94 achieves the 77 MW load change at approximately 93 seconds (102), averages 49.93 MW/min, and thus approximately achieves the 50 MW/min average load rate of change. The graph 90 shows that using the variable multiplier still outperforms using the fixed multiplier, even for a larger load change.

Technical effects of the present embodiments relate to systems and methods for controlling a load rate of change in the industrial system. Specifically, the industrial control system may determine a variable multiplier based at least in part on the commanded load rate of change and a measured load rate of change, which may be applied to a load rate command of the industrial system. The measured load rate of change may be an instantaneous or an average measured load rate of change. As such, variations due to the environment, manufacturing of the industrial system, operation of the industrial system, and the like, may be accounted for. The industrial control system may thus enable the industrial system to achieve a given average load rate of change over a larger span of operational characteristics (e.g., smaller load changes) and maintain the given average load approximately instantaneously.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method comprising:
   determining, via a processor, a commanded load rate of change of an industrial system, wherein the commanded load rate of change comprises a rate of electrical power placed on an industrial machine of the industrial system;
   determining, via the processor, a measured load rate of change of the industrial system, wherein the measured load rate of change comprises a rate of electrical power output by the industrial machine;
   determining, via the processor, a variable multiplier based at least in part on the commanded load rate of change and the measured load rate of change;
   applying, via the processor, the variable multiplier to a load rate command to the industrial system to generate a multiplied load rate command; and
   sending, via the processor, a signal to the industrial system to control the rate of the load placed on the industrial machine based at least in part on the multiplied load rate command.

2. The method of claim 1, wherein determining, via the processor, the measured load rate of change comprises determining an instantaneous measured load rate of change of the industrial system.

3. The method of claim 2, wherein determining, via the processor, the instantaneous measured load rate of change comprises:
   receiving, via the processor, an output power signal of the industrial system;
   applying, via the processor, a filter to reduce noise from the output power signal; and
   differentiating, via the processor, the filtered output power signal.

4. The method of claim 3, wherein the filter includes a load rate limit component configured to limit the output power signal, a backward difference component configured to estimate a rate of change of the output power signal, and a lag component configured to lag the output power signal by a time constant.

5. The method of claim 1, wherein determining, via the processor, the measured load rate of change comprises determining, via the processor, an average measured load rate of change of the industrial system.

6. A system comprising:
   a gas turbine system comprising a gas turbine;
   a sensor communicatively coupled to the gas turbine system, wherein the sensor is configured to detect electrical power output by the gas turbine;
   a controller communicatively coupled to the gas turbine and the sensor, wherein the controller comprises a processor and a memory, wherein the memory stores instructions, wherein the instructions, when executed by the processor, cause the processor to:
      determine a commanded load rate of change of the gas turbine system, wherein the commanded load rate of change comprises a rate of electrical power placed on the gas turbine;
      determine a measured load rate of change of the gas turbine system, wherein the measured load rate of change comprises a rate of the electrical power output by the gas turbine as provided by the sensor;
      determine a variable multiplier based at least in part on the commanded load rate of change and the measured load rate of change;
      apply the variable multiplier to a load rate command to the gas turbine system to generate a multiplied load rate command; and
      send a signal to the gas turbine system to control the rate of the load based at least in part on the multiplied load rate command.

7. The system of claim 6, wherein the instructions, when executed by the processor, cause the processor to determine the measured load rate of change by determining an instantaneous measured load rate of change.

8. The system of claim 7, wherein the instructions, when executed by the processor, cause the processor to determine the instantaneous measured load rate of change by:
   receiving an output power signal of the industrial system from the sensor;
   applying a filter to reduce noise from the output power signal; and
   differentiating the filtered output power signal.

9. The system of claim 8, wherein the filter includes a load rate limit component configured to limit the output power signal, a backward difference component configured to estimate a rate of change of the output power signal, and a lag component configured to lag the output power signal by a time constant.

10. The system of claim 6, wherein the instructions, when executed by the processor, cause the processor to determine the measured load rate of change by determining an average measured load rate of change of the industrial system.

11. The system of claim 6, wherein the gas turbine system comprises a load regulator configured to control an amount of load on the gas turbine based at least in part upon the average measured load rate of change.

12. The system of claim 11, wherein the instructions, when executed by the processor, cause the processor to send the signal to the industrial system by sending the signal to the load regulator.

13. The system of claim 6, wherein the instructions, when executed by the processor, cause the processor to determine the commanded load rate of change based at least in part on receiving a stepped load rate.

14. The system of claim 6, wherein the controller comprises rate detection logic, wherein the instructions, when executed by the processor, cause the processor to determine the commanded load rate of change by receiving successive load setpoints of the gas turbine system and determining an elapsed time between two successive load setpoints using the rate detection logic, wherein each load setpoint is an amount of load placed on the gas turbine system.

15. The system of claim 6, wherein the controller comprises a proportional-integral regulator, wherein the instructions, when executed by the processor, cause the processor to determine the variable multiplier by using the proportional-integral regulator to calculate the variable multiplier based on a difference between the commanded load rate of change and the measured load rate of change.

16. One or more tangible, non-transitory, machine-readable media comprising instructions that, when executed by a processor, are configured to cause the processor to:
   determine a commanded load rate of change of an industrial system, wherein the commanded load rate of change comprises a rate of electrical power placed on an industrial machine of the industrial system;
   determine a measured load rate of change of the industrial system, wherein the measured load rate of change comprises a rate of electrical power output by the industrial machine;
   determine a variable multiplier based at least in part on the commanded load rate of change and the measured load rate of change;
   apply the variable multiplier to a load rate command to the industrial system to generate a multiplied load rate command; and
   send a signal to the industrial system to control the rate of the load placed on the industrial machine based at least in part on the multiplied load rate command.

17. The one or more machine-readable media of claim 15, wherein the instruction to determine the measured load rate of change comprises instructions to cause the processor to determine an instantaneous measured load rate of change of the industrial system.

18. The one or more machine-readable media of claim 17, wherein the instructions to determine the instantaneous measured load rate of change comprises instructions to:
   receive an output power signal of the industrial system;
   filter to reduce noise from the output power signal; and
   differentiate the filtered output power signal.

19. The one or more machine-readable media of claim 18, wherein the instruction to filter include instructions to:
   limit the output power signal;
   estimate a rate of change of the output power signal; and
   lag the output power signal by a time constant.

20. The one or more machine-readable media of claim 16, wherein the instructions to determine the measured load rate of change comprises instructions to cause the processor to determine an average measured load rate of change of the industrial system.

* * * * *